(12) United States Patent
Cicero

(10) Patent No.: US 9,361,873 B2
(45) Date of Patent: Jun. 7, 2016

(54) SPRING LOADED DEVICE THAT OPENS UP WHEN FORCE IS APPLIED AND CLOSES WHEN RELEASED

(76) Inventor: Salvatore G. Cicero, Wetumpka, AL (US)

(*) Notice: Subject to any disclaimer, the term of this patent is extended or adjusted under 35 U.S.C. 154(b) by 0 days.

(21) Appl. No.: 13/355,556

(22) Filed: Jan. 22, 2012

(65) Prior Publication Data

US 2012/0187261 A1 Jul. 26, 2012

Related U.S. Application Data

(60) Provisional application No. 61/435,061, filed on Jan. 21, 2011.

(51) Int. Cl.

| G10K 11/00 | (2006.01) |
|---|---|
| B63B 17/00 | (2006.01) |
| F16M 11/00 | (2006.01) |
| F16M 11/10 | (2006.01) |
| F16M 13/02 | (2006.01) |
| B63B 49/00 | (2006.01) |
| B63B 43/18 | (2006.01) |

(52) U.S. Cl.
CPC .............. *G10K 11/006* (2013.01); *B63B 17/00* (2013.01); *F16M 11/10* (2013.01); *F16M 13/02* (2013.01); *B63B 43/18* (2013.01); *B63B 49/00* (2013.01); *B63B 2017/0054* (2013.01); *F16M 2200/041* (2013.01)

(58) Field of Classification Search
CPC . G10K 11/004; G10K 11/006; G10K 11/008; G10K 1/26; G10K 1/38; B63H 20/08; B63H 20/10; F16M 11/10; F16M 13/02; F16M 200/041; Y10T 24/4072; Y10T 24/4016; Y10T 24/45639; Y10T 24/45675; Y10T 29/49826; B63B 17/00; B63B 49/00; B63B 43/18; B63B 2017/0054

USPC .............. 248/597, 598, 274.1, 288.11, 291.1, 248/292.11, 292.13, 640–643; 367/173, 367/165; 440/53, 63; 114/343

See application file for complete search history.

(56) References Cited

U.S. PATENT DOCUMENTS

| 2,500,032 | A | * | 3/1950 | Helberg | .......................... 24/67.7 |
| 2,547,550 | A | * | 4/1951 | Whitmore | ........................ 16/298 |
| 3,137,907 | A | * | 6/1964 | Unai | ................................ 24/646 |
| 3,459,462 | A | * | 8/1969 | Barnard et al. | ................ 312/228 |
| 3,521,225 | A | * | 7/1970 | Hansford | ............. G10K 11/004 248/291.1 |
| 3,714,619 | A | * | 1/1973 | Morgan | ................ G10K 11/004 367/173 |
| 3,729,162 | A | * | 4/1973 | Salvato | .................... 248/292.13 |
| 3,752,431 | A | * | 8/1973 | McBride | .............. G10K 11/004 248/291.1 |

(Continued)

*Primary Examiner* — Jonathan Liu
*Assistant Examiner* — Guang H Guan
(74) *Attorney, Agent, or Firm* — Dunlap, Bennett & Ludwig PLLC

(57) ABSTRACT

A spring-loaded bracket resiliently moves an item out of the way of an obstruction and resets its position back to its original position once clear of the obstruction. The bracket includes a first plate adapted to attach to an object, such as a boat transom, and a second plate that may resiliently pivot away from the first plate when a force is applied to the second plate and reset back to its original position when the force is removed. A device, such as a transducer, may attach to the second plate. When the first plate is attached to a boat transom and a transducer is attached to the second plate, when the boat moves through water and the transducer strikes an object, the transducer, with the second plate, may resiliently move out of the way and then reset back to its original position once the object has passed.

7 Claims, 3 Drawing Sheets

(56) References Cited

U.S. PATENT DOCUMENTS

| | | | | | |
|---|---|---|---|---|---|
| 3,845,928 A | * | 11/1974 | | Barrett et al. | 248/292.13 |
| 4,449,945 A | * | 5/1984 | | Ferguson | 440/53 |
| 4,667,915 A | * | 5/1987 | | Boucher et al. | 248/292.13 |
| 4,682,560 A | * | 7/1987 | | Lieb | B63B 17/00 114/284 |
| 4,685,464 A | * | 8/1987 | | Goldberger | A61B 5/14552 600/344 |
| 4,741,074 A | * | 5/1988 | | Budano, II | A44B 99/00 224/269 |
| 4,811,310 A | * | 3/1989 | | Wille | 367/173 |
| 4,850,559 A | * | 7/1989 | | Boucher | 248/286.1 |
| 5,005,267 A | * | 4/1991 | | Sugimoto | A44B 11/2511 24/633 |
| 5,109,364 A | * | 4/1992 | | Stiner | 367/165 |
| 5,123,147 A | * | 6/1992 | | Blair | A44B 11/2526 24/633 |
| 5,186,428 A | * | 2/1993 | | Falkenberg | 248/284.1 |
| 5,564,163 A | * | 10/1996 | | Lowry | G06F 1/1679 16/342 |
| 5,574,700 A | * | 11/1996 | | Chapman | G10K 11/006 367/173 |
| 6,053,471 A | * | 4/2000 | | Brown | 248/642 |
| 6,899,574 B1 | * | 5/2005 | | Kalis | G10K 11/006 367/173 |
| 6,928,948 B1 | * | 8/2005 | | Shannon | 114/343 |
| 7,887,019 B2 | * | 2/2011 | | Yeh | G03G 15/605 16/308 |
| 2004/0175997 A1 | * | 9/2004 | | Johnson | B63H 20/10 440/53 |
| 2008/0135716 A1 | * | 6/2008 | | Yeh et al. | 248/597 |
| 2011/0219589 A1 | * | 9/2011 | | Yoneyama | A45D 8/20 24/530 |
| 2012/0187261 A1 | * | 7/2012 | | Cicero | B63B 17/00 248/201 |

\* cited by examiner

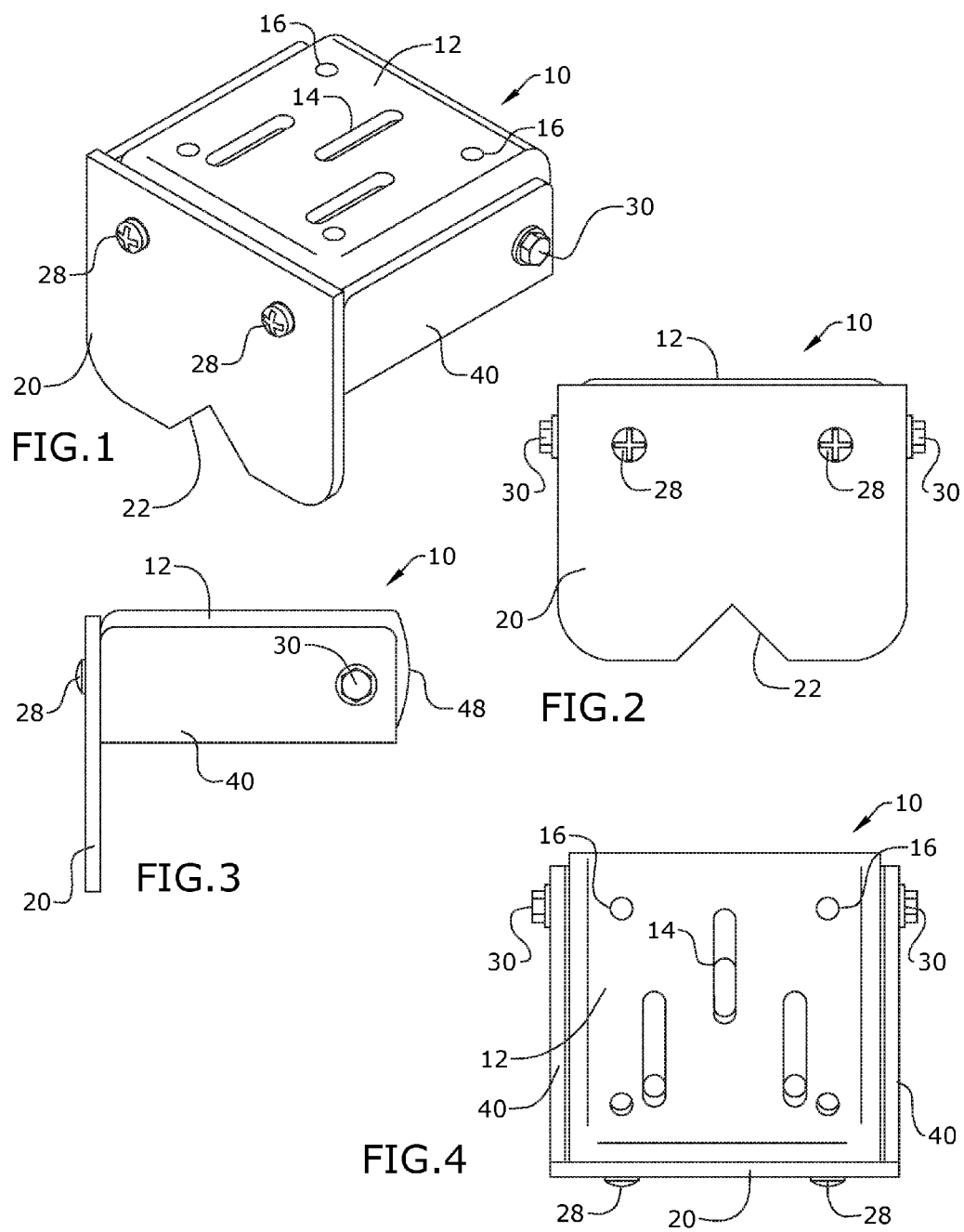

SPRING LOADED DEVICE THAT OPENS UP WHEN FORCE IS APPLIED AND CLOSES WHEN RELEASED

CROSS-REFERENCE TO RELATED APPLICATIONS

This application claims the benefit of priority of U.S. provisional patent application No. 61/435,061, filed Jan. 21, 2011, the contents of which are herein incorporated by reference.

BACKGROUND OF THE INVENTION

The present invention relates to mechanical devices and, more particularly, to a spring loaded device that may be attached to a boat transom for transducer or pitot tube mounting.

Conventional transom mount transducer brackets are locking and non-locking devices, which will not reset automatically, thus requiring a manual reset of the bracket. These types of brackets are liable to break off, resulting in the loss of the transducer. At best, the brackets may be bent and may not reset to their original position without effort on the part of the user.

As can be seen, there is a need for a spring loaded device that may resiliently move an item out of the way of an obstruction and reset its position back to its original position once clear of the obstruction.

SUMMARY OF THE INVENTION

In one aspect of the present invention, a spring-back bracket comprises a bottom bracket adapted to be mounted to a surface; a top bracket adapted to pivot relative to the bottom bracket; and a spring adapted to hold the top bracket against the bottom bracket when no force is applied to the top bracket, the spring permitting the top bracket to pivot away from the bottom bracket when a force is applied to the top bracket.

In another aspect of the present invention, a spring-back bracket comprises a bottom bracket adapted to be mounted to a surface, wherein opposing sides of the bottom bracket have a bottom bracket pivot hole therethrough; at least one hole and at least one slot formed through the bottom bracket; a top bracket adapted to pivot relative to the bottom bracket, wherein opposing sides of the top bracket have a top bracket pivot hole therethrough, and wherein the top bracket pivot holes aligns with the bottom bracket pivot holes; an axel extending through the top bracket pivot holes and the bottom bracket pivot holes, wherein the top bracket pivots about the axel; and a double torsion spring disposed on the axel, the spring adapted to hold the top bracket against the bottom bracket when no force is applied to the top bracket, the spring permitting the top bracket to pivot away from the bottom bracket when a force is applied to the top bracket.

In yet another aspect of the present invention, a method for preventing a boat-mounted transducer from flipping up when a boat passes over an object comprises attaching a bottom bracket to the boat; pivotally attaching a top bracket to the bottom bracket, the top bracket having the transducer attached thereto; resiliently retaining the top bracket to the bottom bracket with a double torsion spring; pivoting the top bracket relative to the bottom bracket when a force is applied to the top bracket; and automatically returning the top bracket to its original position against the bottom bracket when the force is removed due to the resiliency of the spring.

These and other features, aspects and advantages of the present invention will become better understood with reference to the following drawings, description and claims.

BRIEF DESCRIPTION OF THE DRAWINGS

FIG. 1 is a perspective view of a spring-back bracket according to an exemplary embodiment of the present invention;

FIG. 2 is a bottom view of the spring-back bracket of FIG. 1;

FIG. 3 is a side view of the spring-back bracket of FIG. 1;

FIG. 4 is a back view of the spring-back bracket of FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a spring-loaded bracket that may resiliently move an item out of the way of an obstruction and reset its position back to its original position once clear of the obstruction. The bracket may include a first plate adapted to attach to an object, such as a boat transom, and a second plate that may resiliently pivot away from the first plate when a force is applied to the second plate and reset back to its original position when the force is removed. A device, such as a transducer, may attach to the second plate. When the first plate is attached to a boat transom and a transducer is attached to the second plate, when the boat moves through water and the transducer strikes an object, the transducer, with the second plate, may resiliently move out of the way and then reset back to its original position once the object has passed. With the spring-loaded bracket, a user may not have to reposition their transducer if it has flipped up from an object in the water. A splash guard may be included on the first bracket to avoid water displacement and to direct the water to the transducer.

Figure 5:
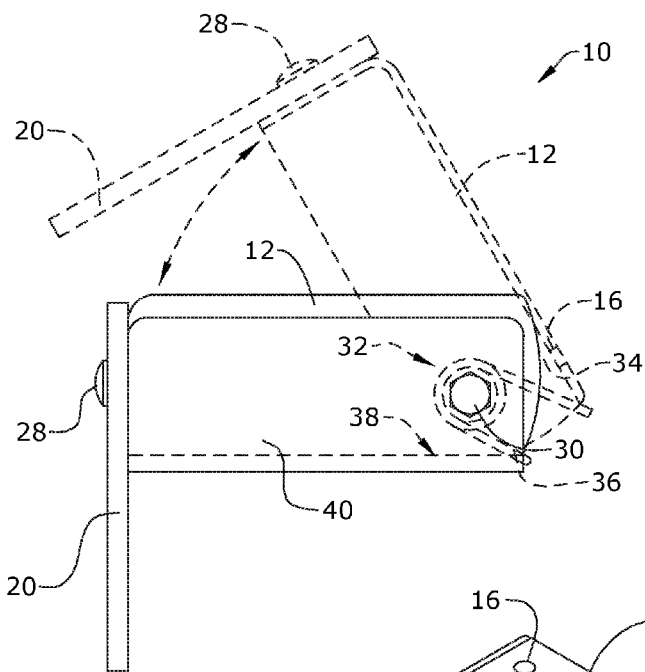
FIG. 5 is a side view of the spring-back bracket of FIG. 1, showing the rotational motion of the bracket.
Figure 6:
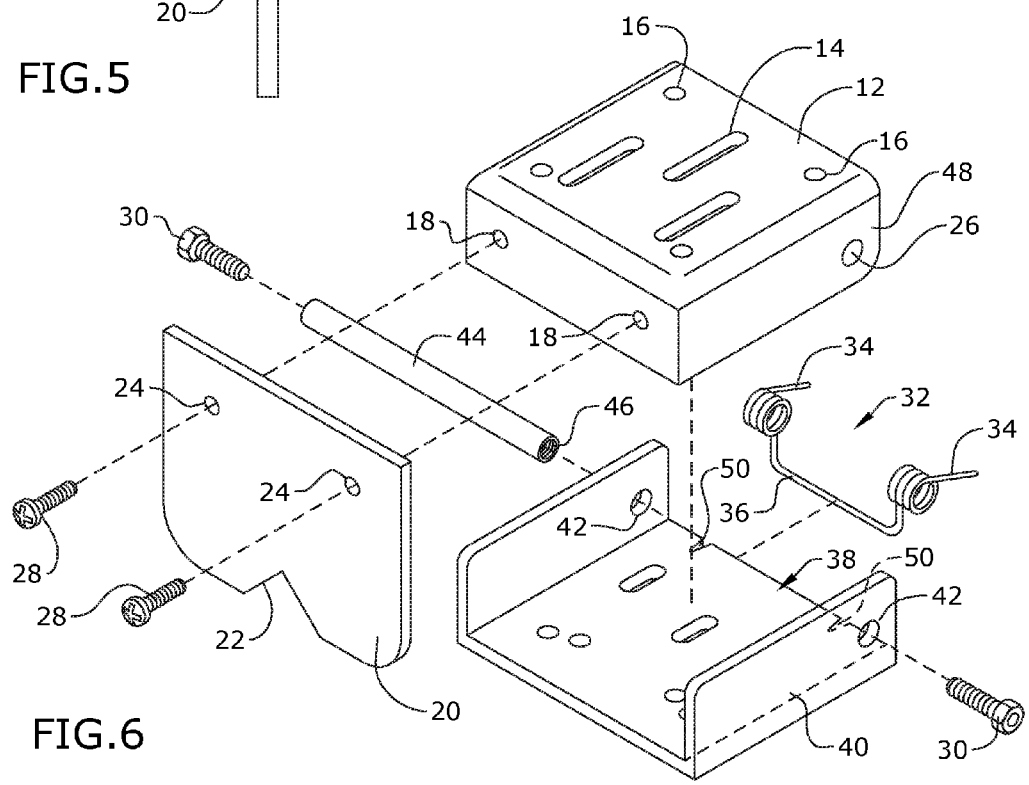
FIG. 6 is an exploded view of the spring-back bracket of FIG. 1.
Figure 7:
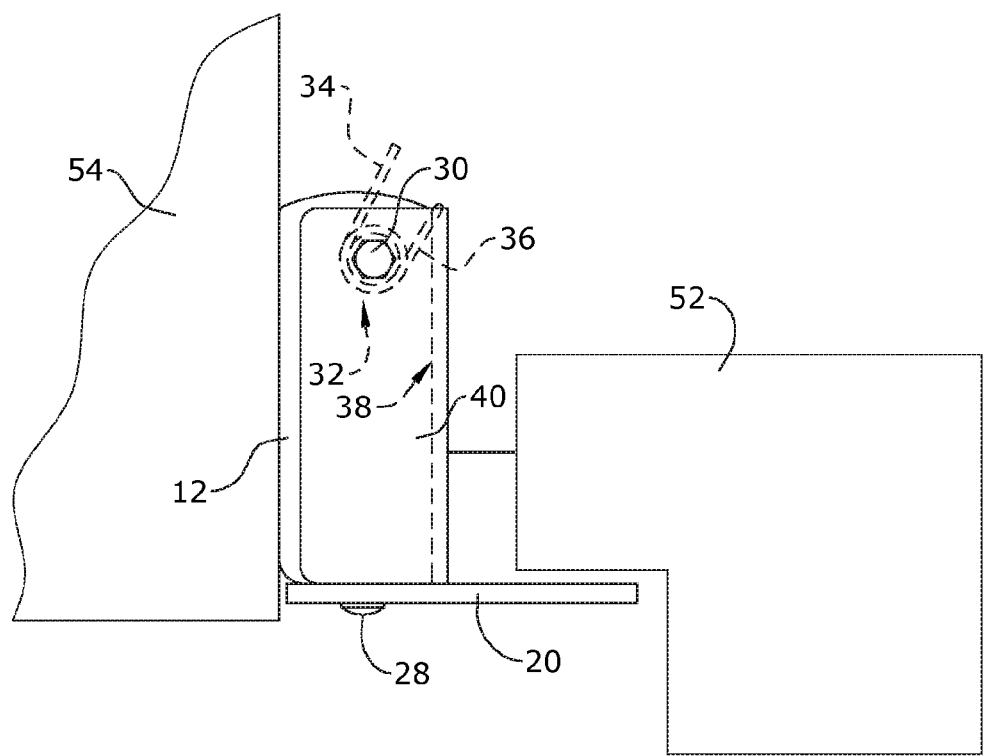
FIG. 7 is a side view of an embodiment of the present invention in use.

Referring to FIGS. 1 through 6, a spring-back bracket 10 may include a bottom bracket 12 typically having at least one slot 14 and at least one mounting hole 16 disposed therethrough. The bottom bracket 12 may be a plate member having three sides extending generally perpendicular from the plate member. A bottom side of the bottom bracket 12 may have at least one mounting hole 18 formed therethrough. Opposing sides of the bottom bracket 12 may have a pivot hole 26 formed there through. The opposing sides of the bottom bracket 12 may connect to the bottom side of the bottom bracket 12. In some embodiments, the bottom bracket 12 may be a single, integral member, including the bottom side and the opposing sides.

A splash plate 20 may attach to the bottom bracket 12 with, for example, pan head screws 28, through holes 24 in the splash plate 20. In some embodiments, the splash plate 20 may be welded to the bottom bracket 12. In other embodiments, the splash plate 20 may be formed integrally with the bottom bracket. The splash plate 20 may extend away from the plate member of the bottom bracket 12. A notch 22 may be cut in a distal end of the splash plate 20. The splash plate 20 may help avoid water displacement and to direct the water to the transducer 52.

In some embodiments, a plurality of holes 16 may be disposed through the bottom bracket 12. For example, four holes 16 may be disposed in corners of the bottom bracket 12. In some embodiments, a plurality of slots 14, for example, three parallel slots, may be disposed through the bottom bracket 12. The holes 16 and slots 14 may be used to mount the bottom bracket 12 to an object, such as a boat transom 54.

The boat transducer 52 is attached to a second plate of a top bracket 40. The top bracket 40 may be a generally U-shaped bracket having sides that fit over the sides of the bottom bracket 12. The sides of the top bracket 40 may have pivot holes 42 that may align with the pivot holes 26 of the bottom bracket 12. An axel 44 may extend through the aligned pivot holes 26, 42 to pivotally engage the top bracket 40 to the bottom bracket 12. Hex head screws 30 may thread into the axel 44 to retain the axel 44 in the pivot holes 26, 42. A double torsion spring 32 may be disposed on the axel 44. A spring U-joint 36 may fit into notches 50 in an edge 38 of the top bracket 40. Spring extensions 34 may be disposed against an edge of the bottom bracket 12. The spring 32 may resiliently hold the top bracket 40 to the bottom bracket 12, as shown in FIG. 1.

A device, such as a transom 54, may attach to the top bracket 40. When an object strikes the device, the top bracket 40 may pivot about the axel 44, moving the device out of the way of the object. Once the object is cleared, the top bracket 40 may move back against the bottom bracket (as shown in FIG. 1), returning the device back to its original position. The bottom bracket 12 may include a rounded shoulder 48 to permit the top bracket 40 to pivot about the axel 44.

The top bracket 40 and the bottom bracket 12 may be from about 1 inch square and about 0.5 inch deep, up to, for example, about 12 inches square, and about 3 inches deep. In one embodiment, the brackets 40, 12 may be about 2⅜ inches wide, 2³⁄₁₆ inches high and about 1 inch deep.

The components of the spring-back bracket 10 may be made from various materials, such as plastic, metal (including steel, stainless steel, aluminum, or the like), composite, and the like. In some embodiments stainless steel may be used for the components, especially the spring 34.

While the above describes a spring-back bracket that may be used for mounting a transducer to a boat transom, the spring-back bracket may be used in various applications where resilient deflection of an object is desired.

It should be understood, of course, that the foregoing relates to exemplary embodiments of the invention and that modifications may be made without departing from the spirit and scope of the invention as set forth in the following claims.

What is claimed is:

1. An apparatus comprising:
a bottom bracket including a base plate, the bottom bracket adapted to be mounted to a boat transom, the bottom bracket having side walls extending from sides of the base plate and a bottom wall extending from a bottom side of the base plate, the bottom wall extending generally perpendicularly from the base plate and interconnecting ends of the side walls;
a top bracket including a second plate, the top bracket pivotally connected to the bottom bracket by an axle, wherein the bottom wall of the bottom bracket extends from the bottom side of the base plate of the bottom bracket towards the top bracket, the top bracket having a U-shape with top bracket sides disposed adjacent to the side walls of the bottom bracket in a non-pivoted position;
a spring disposed about the axle and resiliently retaining the top bracket towards the bottom bracket, the spring comprising a U-shaped portion retained in notches formed in an edge of the top bracket, the spring permitting the top bracket to pivot away from the bottom wall of the bottom bracket against resiliency of the spring when a force is applied to the top bracket;
a splash guard plate extending from the bottom wall of the bottom bracket, the splash guard plate comprising a distal end comprising an outer edge, wherein a notch is cut into the outer edge of the distal end, wherein the distal end extends beyond the top bracket in the non-pivoted position; and
a boat transducer attached to the second plate of the top bracket, wherein the notch cut into the outer edge of the distal end of the splash guard plate is positioned to direct water to the boat transducer.

2. The apparatus of claim 1, wherein the bottom bracket includes at least one hole and at least one slot therethrough.

3. The apparatus of claim 1, wherein the side walls of the bottom bracket each have a bottom bracket pivot hole therethrough.

4. The apparatus of claim 3, wherein the top bracket sides of the top bracket each have a top bracket pivot hole therethrough.

5. The apparatus of claim 4, wherein the axle extends through the top bracket pivot holes and the bottom bracket pivot holes, wherein the top bracket pivots about the axle.

6. The apparatus of claim 1, wherein the spring is a double torsion spring.

7. An apparatus comprising:
a bottom bracket including a base plate, the bottom bracket adapted to be mounted to a surface, wherein opposing sides of the bottom bracket each have a bottom bracket pivot hole therethrough, and wherein the bottom bracket has a bottom wall extending from a bottom side of the base plate, the bottom wall extending generally perpendicularly from the base plate and interconnecting ends of the opposing sides;
at least one hole and at least one slot formed through the bottom bracket;
a top bracket including a second plate, the top bracket adapted to pivot away from the bottom wall of the bottom bracket, wherein the bottom wall of the bottom bracket extends from the bottom side of the base plate of the bottom bracket towards the top bracket, wherein opposing sides of the top bracket each have a top bracket pivot hole therethrough, and wherein the top bracket pivot holes align with the bottom bracket pivot holes;
an axle extending through the top bracket pivot holes and the bottom bracket pivot holes, wherein the top bracket pivots about the axle;
a double torsion spring disposed on the axle and resiliently retaining the top bracket towards the bottom bracket, the double torsion spring comprising a U-shaped portion retained in notches formed in an edge of the top bracket, the double torsion spring permitting the top bracket to pivot away from the bottom bracket against resiliency of the double torsion spring when a force is applied to the top bracket;
a splash guard plate extending from the bottom wall of the bottom bracket, the splash guard plate comprising a distal end comprising an outer edge, wherein a notch is cut into the outer edge of the distal end, wherein the distal end extends beyond the top bracket in a non-pivoted position; and a boat transducer attached to the second plate of the top bracket, wherein the notch cut into the outer edge of the distal end of the splash guard plate is positioned to direct water to the boat transducer.

\* \* \* \* \*